(12) United States Patent
Rocker et al.

(10) Patent No.: US 7,396,252 B2
(45) Date of Patent: Jul. 8, 2008

(54) RELEASABLE UTILITY LINE RETENTION APPARATUS

(76) Inventors: David L. Rocker, 3161 Turnberry Cir., Charlottesville, VA (US) 22911; Antonio Q. L. Rhodes, 2703 W. Main St., Richmond, VA (US) 28220; Randall L. Herron, 26 Venus Dr., Waynesboro, VA (US) 22980

( * ) Notice: Subject to any disclaimer, the term of this patent is extended or adjusted under 35 U.S.C. 154(b) by 0 days.

(21) Appl. No.: 11/566,712

(22) Filed: Dec. 5, 2006

(65) Prior Publication Data

US 2008/0128161 A1    Jun. 5, 2008

(51) Int. Cl.
*H01R 13/58* (2006.01)
(52) U.S. Cl. .................. 439/474; 174/40 TD
(58) Field of Classification Search ........... 439/474, 439/475, 516, 923; 174/40 TD, 45 TD
See application file for complete search history.

(56) References Cited

U.S. PATENT DOCUMENTS 5,623,122 A * 4/1997 Anderson et al. ....... 174/40 TD

* cited by examiner

*Primary Examiner*—Khiem Nguyen
(74) *Attorney, Agent, or Firm*—24IP Law Group; Timothy R. DeWitt

(57) ABSTRACT

A device or apparatus that reduces the number of utility pole breakages occurring during severe weather events and facilitates quicker and more cost efficient repair of downed utility lines. The device secures utility lines such as power service lines to utility poles during normal operating conditions, but allow the lines to break free of the poles when severely stressed. This breakaway feature prevents the utility pole from breaking under high stress conditions such as storm damage, ice accumulation, felled trees and other unexpected emergency situations. Furthermore, the device allows for quick and efficient repair of downed power lines, thereby reducing the man hours and equipment necessary for repair. By protecting the utility pole, utility companies will realize significant cost savings by not having to replace the pole and, in some cases, having to replace expensive transformers.

15 Claims, 12 Drawing Sheets

300

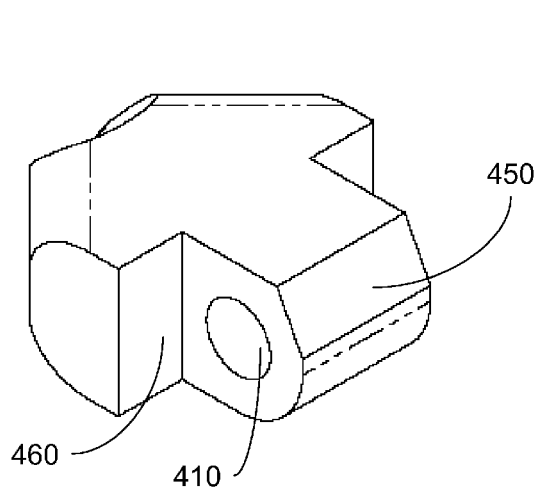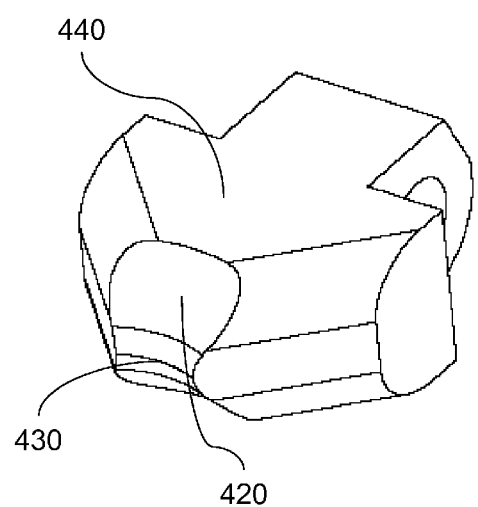
FIG. 4a
FIG. 4b

300
RELEASABLE UTILITY LINE RETENTION APPARATUS

BACKGROUND OF THE INVENTION

1. Field of the Invention

The present invention relates to the field of utility lines and poles suspending such lines above ground, and more particularly, an apparatus for connecting utility lines to utility poles.

2. Brief Description of the Related Art

Utility lines such as power, telephone and cable television lines are commonly strung over long and short distances by suspending them in the air via a series of utility poles. Such utility line systems are subject to damage by falling debris such as trees or large tree branches. When, for example, a tree falls on a utility line, the force exerted by the tree on the utility line often can damage the utility poles suspending the line above ground or cause a break in the line itself. The costs and effort associated with repairing damaged utility poles often exceeds the costs of repairing the utility line and the costs of repairing or replacing a broken line often exceeds the costs that would be associated with simply re-attaching a fallen line to a series of utility poles.

SUMMARY OF THE INVENTION

The present invention is a device or apparatus that reduces the number of utility pole breakages occurring during severe weather events and facilitates quicker and more cost efficient repair of downed utility lines. Specifically, in a preferred embodiment the present invention is a device or apparatus that will secure utility lines such as power service lines to utility poles during normal operating conditions, but allow the lines to break free of the poles when severely stressed. This breakaway feature will prevent the utility pole from braking under high stress conditions such as storm damage, ice accumulation, felled tress and other unexpected emergency situations. Furthermore, the device allows for quick and efficient repair of downed power lines, thereby reducing the man hours and equipment necessary for repair. By protecting the utility pole, utility companies will realize significant cost savings by not having to replace the pole and, in some cases, having to replace expensive transformers.

In addition to the significantly lower material and labor cost, the total recovery time per emergency event will be dramatically reduced. Rapid power restoration is not only desired by the consumer and advocated for by the U.S. Department of Energy, but it allows utility power service providers to resume profitable operations much sooner. This will convert a negative cash flow situation into a positive one in a fraction of the time.

Furthermore, it is anticipated that it will contribute significantly to the overall health and well being of the general population by greatly reducing the time that it is exposed to the elements as a result of a lack of electricity after a disastrous event. It is anticipated that this will contribute greatly to our national security and level of preparedness as a direct result of the timeliness with which electric utility and other utility companies can restore power.

In a preferred embodiment, the present invention is an apparatus for releasably securing a utility line to a utility pole. The apparatus comprises a latch member having an opening at one end for securing the latch member to a utility line. A latching assembly releasably secures to the latch member, and a support member secures said latching assembly to a utility pole. The latch member may comprise a shaft having a bullet member on a first end and a cable clamp mounting portion on a second end, wherein the opening for securing the latch member to a utility pole is in the cable clamp mounting portion. The latching assembly may comprise a housing, a pivot block secured to the housing, a pawl rotatably secured to the pivot block and a compression assembly for biasing the pawl. The compression assembly may comprises a top spring plate, a bottom spring plate and at least one spring between the top and bottom spring plates for biasing them away from one another.

In another embodiment, the latching assembly may comprise a housing, a plurality of pivot blocks secured to the housing, a plurality of pawls with each pawl being rotatably secured to one of the pivot blocks via a pivot pin, a first plate having an opening therein for receiving the latch member there through, a second plate having an opening therein for receiving the latch member there through; and at least one biasing member between the first and second plates. The latching member extends through the openings in the first and second plates and the bullet extends past the plurality of pawls and the first and second plates bias the pawls such that a substantial force is required to remove the latch member from said housing. One or both of the first and second plates may comprise a body having at least one stabilization surface. Further, the first and second plates each may have a lead-in surface adjacent their respective openings for receiving the latch member. The biasing member may comprise one or more springs and the first and second plates may have recesses therein for receiving the springs and holding them in place.

In yet another embodiment, the present invention is an apparatus for releasably securing a utility line to a utility pole that comprises a housing assembly comprising means for securing to a utility pole and means for releasable securing to a latch means; and a latch means for securing a utility line to said housing assembly.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be leaned by practice of the invention.

BRIEF DESCRIPTION OF THE DRAWINGS

For a more complete understating of the present invention and the advantages thereof, reference is now made to the following description and the accompanying drawings, in which:

FIG. 4a is a first perspective view of a pawl of a releasable utility line suspension apparatus in accordance with a preferred embodiment of the present invention.

FIG. 4b is a second perspective view of a pawl of a releasable utility line suspension apparatus in accordance with a preferred embodiment of the present invention.

DETAILED DESCRIPTION OF THE PREFERRED EMBODIMENTS

In a preferred embodiment, the releasable utility line retention apparatus in accordance with the present invention is made up of two parts, the first part being secured to the utility line and the second part being secured to the utility pole. The first part is coupled to the second part and remains connected during normal operating conditions. When the utility line is severely stressed, the first part will break free from second part to permit the utility line to drop to the ground and thereby relieving the stress and preventing damage to the utility line and/or utility pole.

Figure 5A:
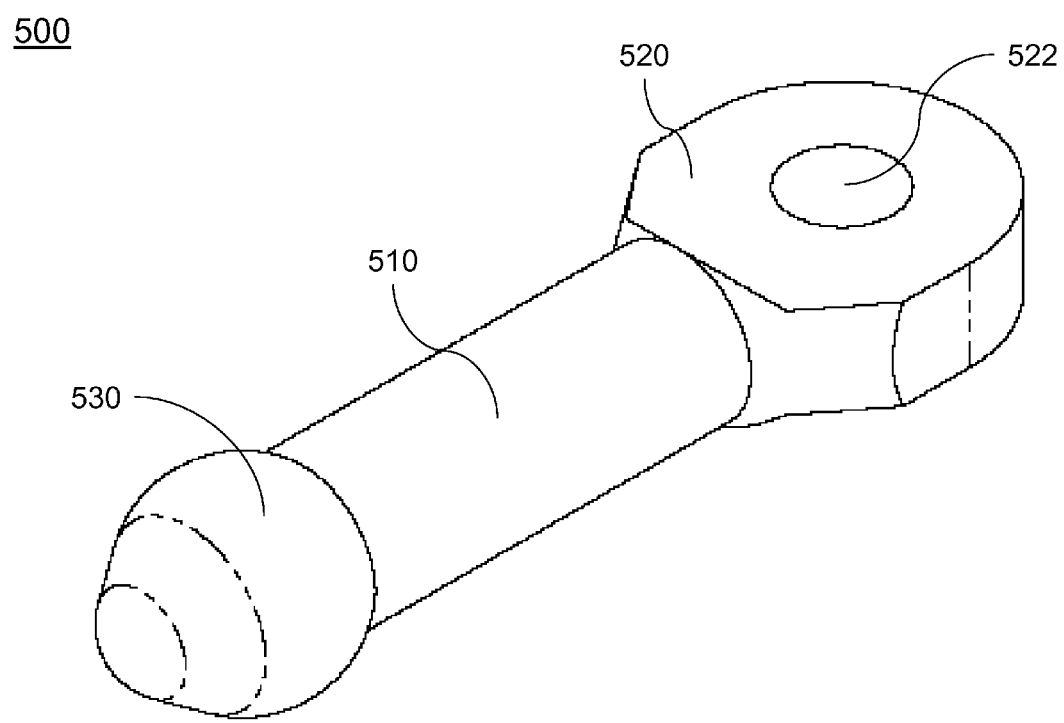
FIG. 5a is a perspective view of a latch bullet of a releasable utility line suspension apparatus in accordance with a preferred embodiment of the present invention.
Figure 5C:
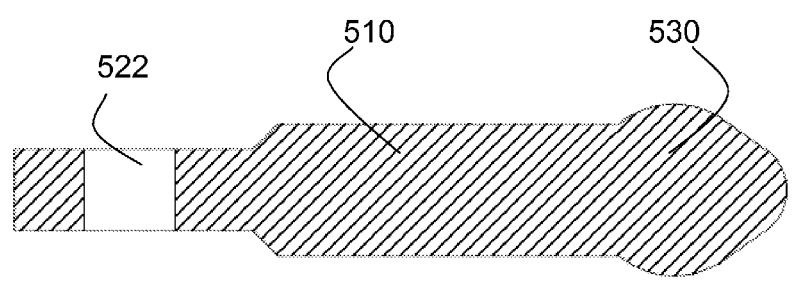
FIG. 5c is a cross-sectional view of a latch bullet of a releasable utility line suspension apparatus in accordance with a preferred embodiment of the present invention.
Figure 5B:
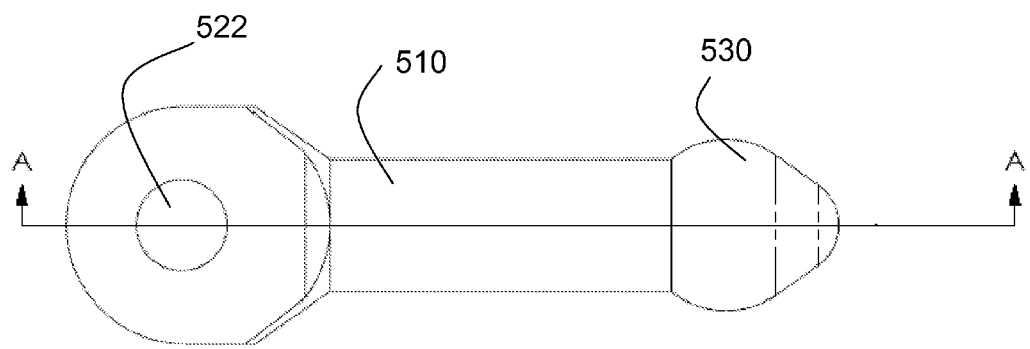
FIG. 5b is a side view of a latch bullet of a releasable utility line suspension apparatus in accordance with a preferred embodiment of the present invention.

In a preferred embodiment, the first part is a "latch bullet" 500 such as is shown in FIG. 5. The latch bullet 500 has a shaft 510 with a cable clamp mounting portion 520 on one end and a "bullet tip" on the opposite end. The cable clamp mounting portion 520 has a cable clamp mounting hole 522 therein for securing the latch bullet 500 to a utility line. The bullet tip 530 is larger than the shaft 510 for securing the latch bullet 500 the second part of the apparatus.

Figure 2:
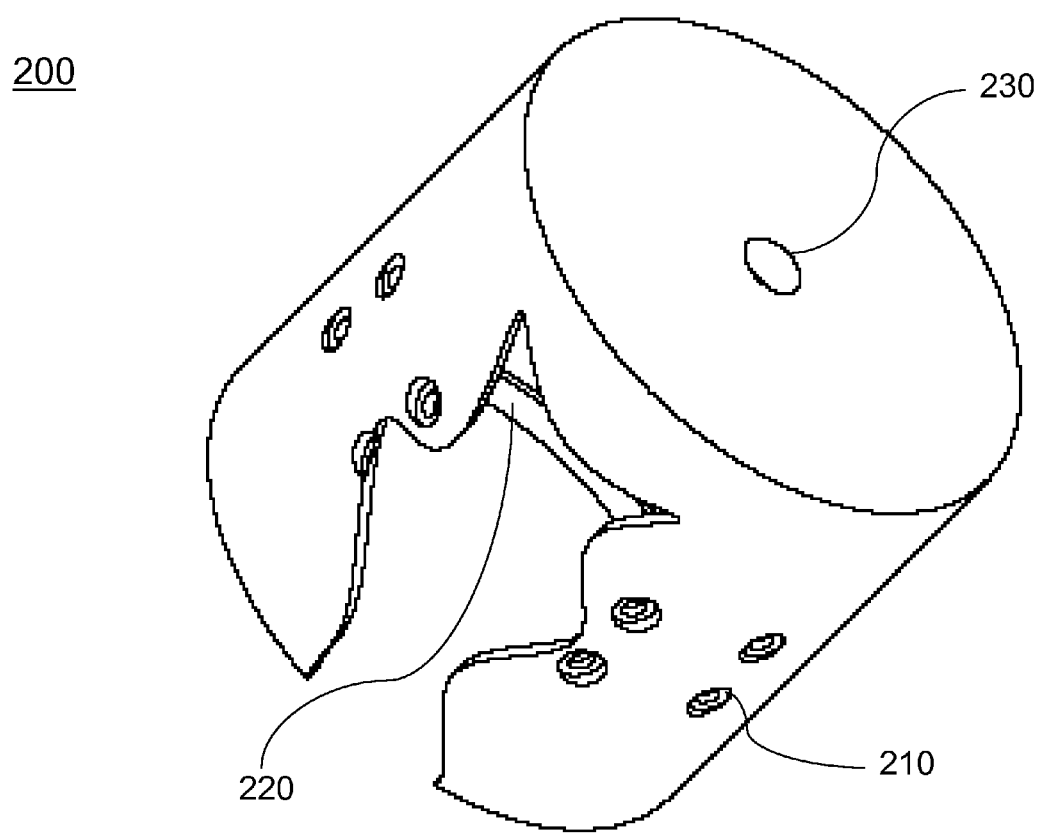
FIG. 2 is a perspective view of a housing of a releasable utility line suspension apparatus in accordance with a preferred embodiment of the present invention.
Figure 3A:
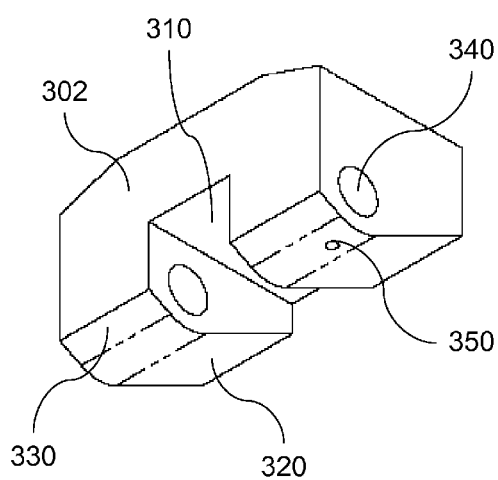
FIG. 3a is a first perspective view of a pivot block of a releasable utility line suspension apparatus in accordance with a preferred embodiment of the present invention.
Figure 3B:
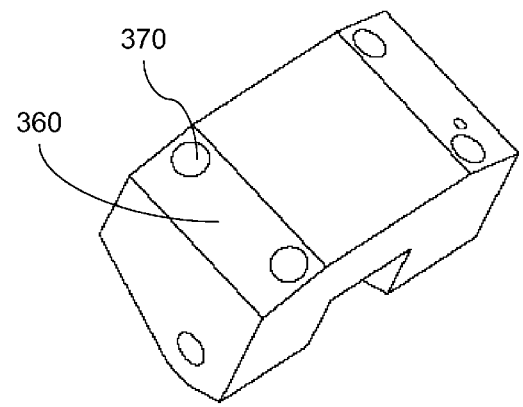
FIG. 3b is a second perspective view of a pivot block of a releasable utility line suspension apparatus in accordance with a preferred embodiment of the present invention.
Figure 4C:
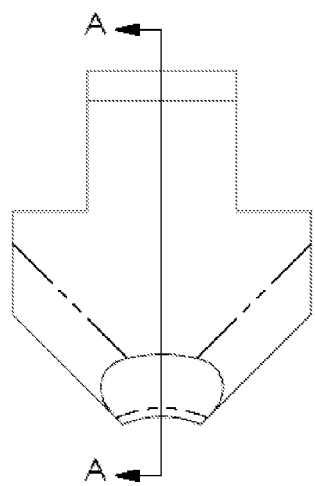
FIG. 4c is a top view of a pawl of a releasable utility line suspension apparatus in accordance with a preferred embodiment of the present invention.
Figure 4D:
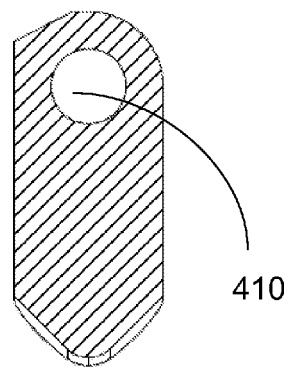
FIG. 4d is a cross-sectional view of a pawl of a releasable utility line suspension apparatus in accordance with a preferred embodiment of the present invention.
Figure 4E:
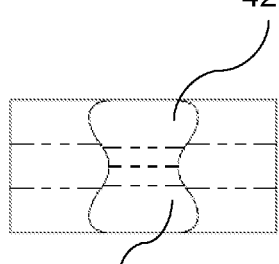
FIG. 4e is an end view of a pawl of a releasable utility line suspension apparatus in accordance with a preferred embodiment of the present invention.
Figure 4F:
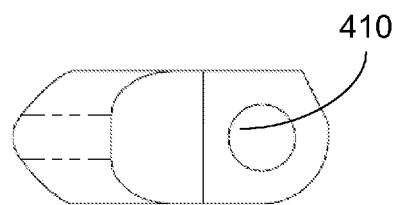
FIG. 4f is a side view of a pawl of a releasable utility line suspension apparatus in accordance with a preferred embodiment of the present invention.

The second part of the apparatus is a housing assembly 100. The housing assembly 100 has a cylindrical housing 200. While the housing is cylindrical in this preferred embodiment, other shapes may be used for the housing 200. The housing 200 has an "open" end and a "closed" end. The open end of the housing 200 has a retainer ring groove around its interior circumference. The closed end of the housing 200 has a swivel support mounting hole 230 therein. Around its circumference, the housing 200 has a plurality of sets of pivot block mounting holes 210. As shown in FIG. 2, each set of pivot block mount holes 210 is comprised of four holes. Other arrangements, such as one, two, three or more holes may be used. In the preferred embodiment, there are four sets of pivot block mounting holes 210. Again, other arrangements are possible.

A pivot block 300 is connected to each set of pivot block mounting holes 210 via, for example, shoulder screws. Other connecting means may likewise be used for securing the pivot blocks 300 to the housing 200. In the preferred embodiment, there are four pivot blocks mounted to the housing 200, but arrangements using more or less pivot blocks 300 are possible and will be apparent to those of ordinary skill in the art. Each pivot block 300 has a body 302 having a link notch 310, an engage positive stop 320, a disengage positive stop 330, a pair of pawl pivot pin holes 340, a spring pin hole 350, a back surface 360 and a plurality of mounting holes 370 in the back surface 360. The mounting holes 370 are used to mount the pivot block 300 to the housing 200 via shoulder screws or other mounting means through the pivot block mounting holes 210. The link notch 310 may also serve as a positive stop during disengagement.

The housing assembly 100 further has a plurality of pawls 400 rotatably secured to the pivot blocks 300 via a pawl pivot pin 800, which has a pivot surface 810 and a spring pin hole 820. Each pawl 400 has a pivot pin hole 410 therein for rotatably securing the pawl to a pivot block 300. Each pawl 400 further has an engagement surface 420, a disengagement surface 430, a bottom surface 440, a disengagement stop 450 and an engagement positive stop 460.

Figure 6A:
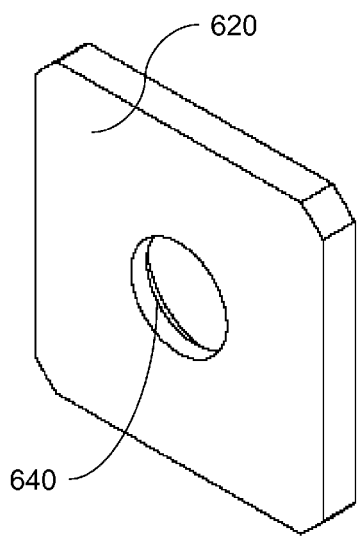
FIGS. 6a and b are top and bottom perspective views of a top spring plate of a releasable utility line suspension apparatus in accordance with a preferred embodiment of the present invention.
Figure 6B:
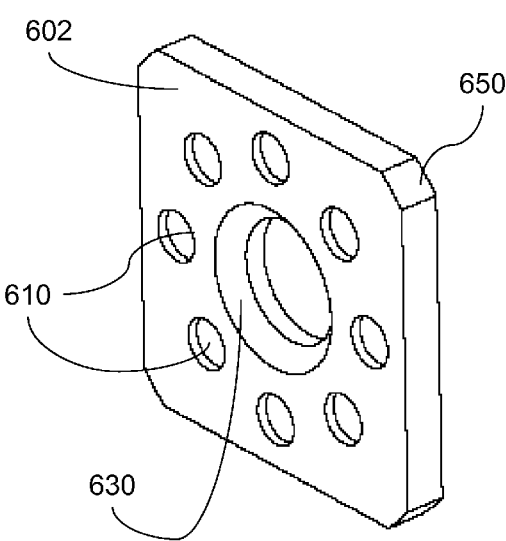

The housing assembly 100 further has a top spring plate 600, which is described with respect to FIG. 6. The top spring plate 600 has a plurality of spring recesses 610 in a front surface 602. The top spring plate 600 further has a bullet access hole 640 with a lead in 630 adjacent the front surface 602. In a preferred embodiment, the top spring plate 600 additionally has a plurality of angled surfaced 650 for providing stabilization, i.e., the stabilizing surfaces 650 keep the top spring plate 600 centered in the housing 200 in case of a sideward force on the utility line.

Figure 7A:
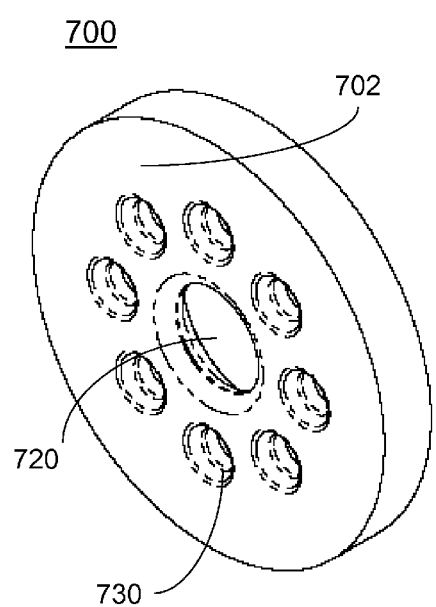
FIGS. 7a and b are top and bottom perspective views of a bottom spring plate of a releasable utility line suspension apparatus in accordance with a preferred embodiment of the present invention.
Figure 7B:
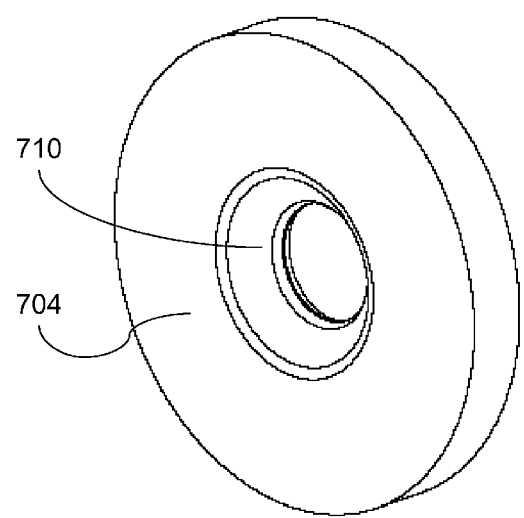
Figure 8:
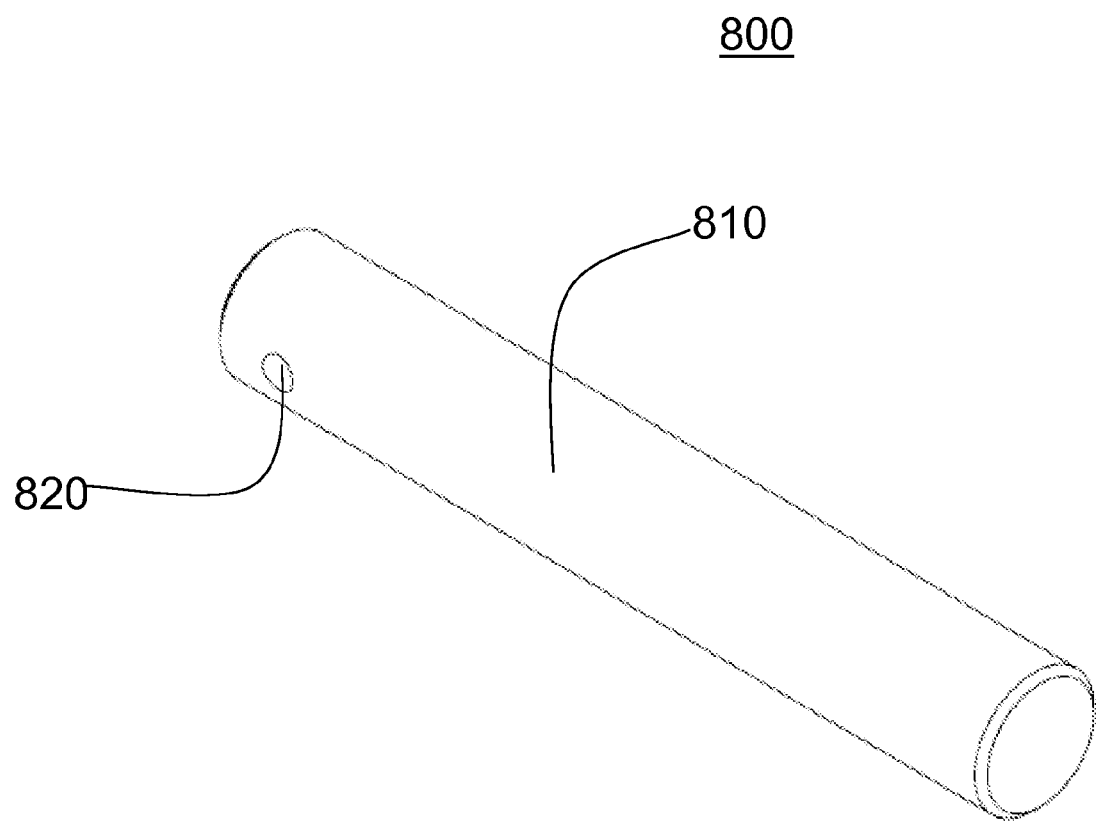
FIG. 8 is a perspective view of a pawl pivot pin of a releasable utility line suspension apparatus in accordance with a preferred embodiment of the present invention.

The housing assembly 100 further has a bottom spring plate 700, which will be described with reference to FIGS. 7a and b. The bottom spring plate has a front surface 702 and a rear surface 704. The front surface 702 has a plurality of spring recesses 730 therein and a bullet access hole 720. The bullet access hole 720 has a lead-in surface 710 adjacent the rear surface 704 of the bottom spring plate.

Figure 1:
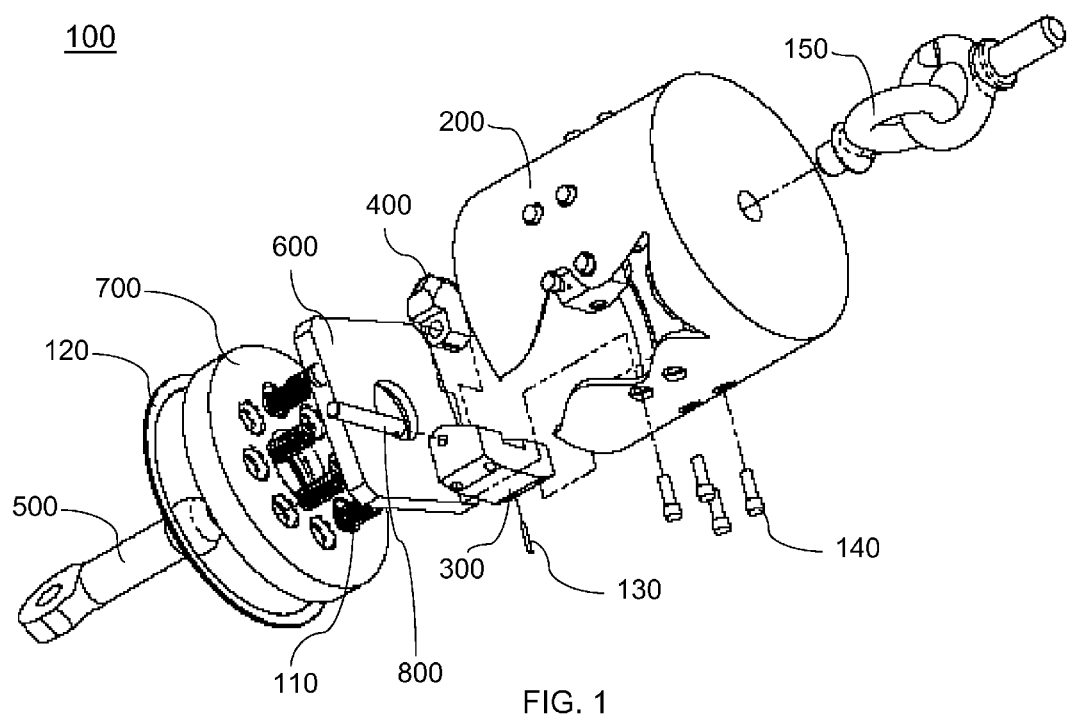
FIG. 1 is an assembly drawing of a releasable utility line suspension apparatus in accordance with a preferred embodiment of the present invention.

As shown in FIG. 1, the pivot blocks 300 are secured to the housing 200 via a plurality of mounting screws 140. The pawls 400 are secured to their respective pivot blocks via pawl pivot pins 800. A spring pin 130 secures the pawl pivot pin 800 in the pivot block 300. A plurality of springs 110 are placed between the top spring plate 600 and bottom spring plate 700 with ends in the recesses in those two plates. The top and bottom spring plates are placed inside the housing 200 and held within the housing 200 via a retainer ring 120. A swivel support 150 is secured to the housing 200 through hole 230. One of skill in the art, however, will understand that the swivel support may be made in many other ways.

Figure 9:
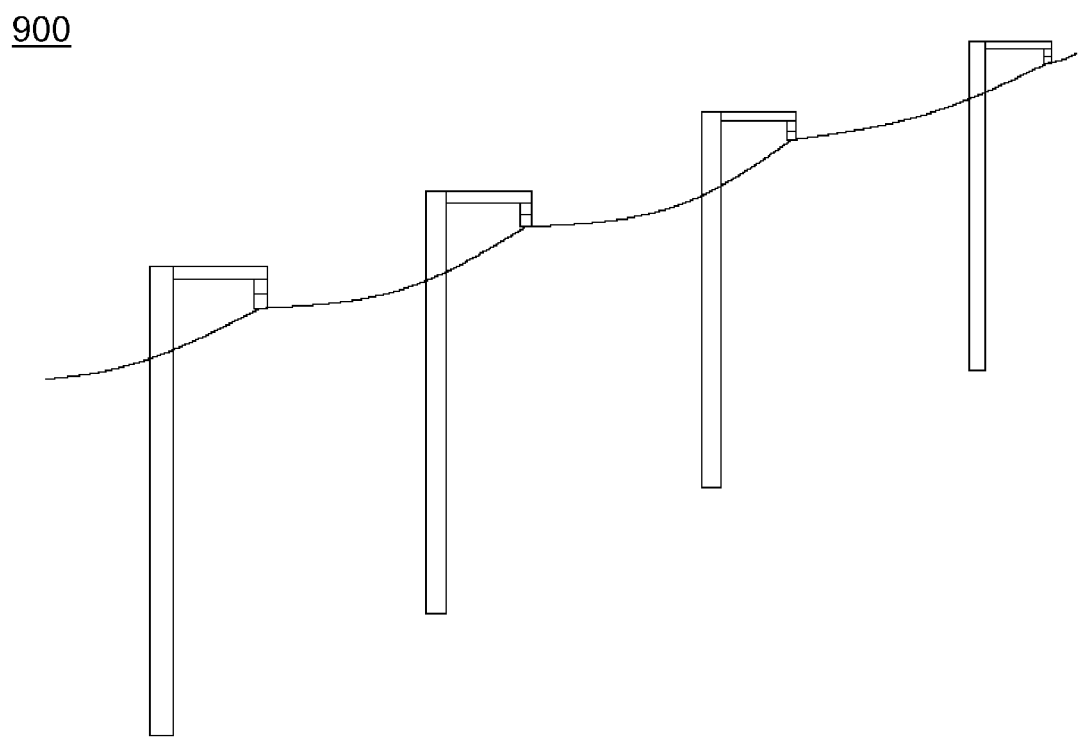
FIG. 9 is a diagram of a utility line connected to a series of utility poles using a releasable utility line suspension apparatus in accordance with a preferred embodiment of the present invention.

In this embodiment, the latch bullet 500 is secured to the power line via the cable clamp hole 520. The housing assembly 100 is secured to the utility pole via a swivel support 150. The latch bullet 500 is connected to the housing assembly 100 by inserting the bullet tip 530 into the hole 720 in the bottom spring plate 700. The bullet tip 530 passes through the hole 640 in the top plate 600 and makes contact with a set of two or more pawls 400 which are attached to their respective pivot blocks 300. The bullet tip 530 pushes on the pawl's engagement surface 420 causing them to rotate upward in their pivot blocks 300. As the pawls 400 rotate upward, the space between their tips increases to a point that allows the bullet tip 530 to move past them. Gravity then causes the pawls 400 to then rotate back downward until their tips surround the shaft 520 of the latch bullet 500. As gravity continues to pull downward on the latch bullet 500, the bullet tip 530 applies pressure to the "disengagement surface" 430 of the pawls 400. The pawls 400 continue rotating downward until they come to rest against the top plate 600. The two parts are now coupled to one another and remain so coupled during normal operating conditions as shown in FIG. 9.

Figure 10:
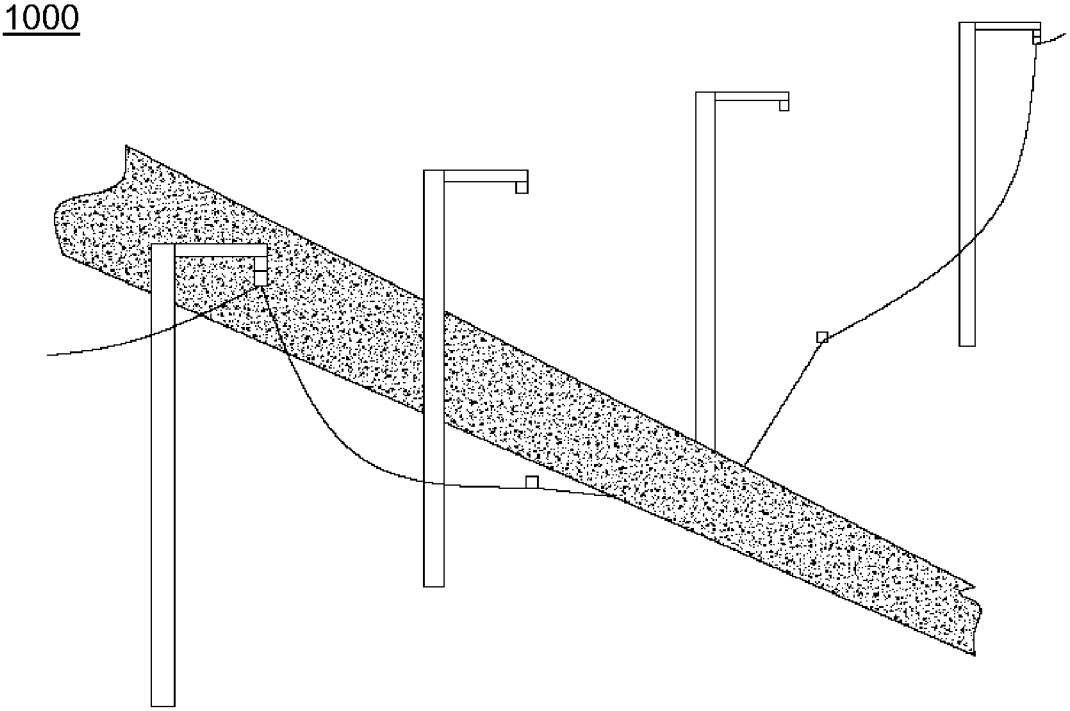
FIG. 10 is a diagram of a tree that has fallen on a utility line connected to a series of utility poles using a releasable utility line suspension apparatus in accordance with a preferred embodiment of the present invention.

During conditions when the power line is severely stressed, downward force is applied to the utility line such as is shown in FIG. 10, which, in turn, applies a downward force to the latch bullet 500. This causes the bullet tip 530 to apply a downward force on the disengagement surface 430 of the pawls 400. The pawls 400 then apply pressure to the top plate 600. If the force is high enough to compress the springs 110 installed between the top and bottom plates 600, 700, the top plate 600 will move downward allowing the pawls 400 to continue rotating downward as well. As the pawls 400 rotate downward, the space between their tips increases to a point that allows the bullet tip 530 to move past them. The latch bullet 500 and utility line then break free from the utility pole and fall safely to the ground and the pole is protected from breakage.

The utility company can then send a modest sized crew out to remove the tree or other such obstruction and they can simply reinsert the latch bullet 500 into the housing assembly 100 and restore power. They do not need to set another new pole.

The components used in the housing assembly may be chosen to adjust the force necessary to disengage the latch bullet from the housing assembly. For example, while 8 springs are shown between the top and bottom spring plates in the preferred embodiment, a different number of springs or different types of springs may be chosen to achieve different release tensions.

The foregoing description of the preferred embodiment of the invention has been presented for purposes of illustration and description. It is not intended to be exhaustive or to limit the invention to the precis form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. An apparatus for releasably securing a utility line to a utility pole comprising:
    a latch member having an opening at one end for securing said latch member to a utility line;
    a latching assembly for releasably securing to said latch member;
    a support member for securing said latching assembly to a utility pole
    wherein said latching assembly comprises:
        a housing;
        a pivot block secured to said housing;
        a pawl rotatably secured to said pivot block; and
        a compression assembly for biasing said pawl.

2. An apparatus according to claim 1, wherein said latch member comprises a shaft having a bullet member on a first end and a cable clamp mounting portion on a second end, wherein said opening for securing said latch member to a utility line is in said cable clamp mounting portion.

3. An apparatus according to claim 1, wherein said compression assembly comprises:
    a top spring plate;
    a bottom spring plate; and
    at least one spring between said top spring plate and said bottom spring plate for biasing said top and bottom spring plates away from one another.

4. An apparatus for releasably securing a utility line to a utility pole comprising:
    a latch member having an opening at one end for securing said latch member to a utility line;
    a latching assembly for releasably securing to said latch member; and
    a support member for securing said latching assembly to a utility pole;
    wherein said latching assembly comprises:
        a housing;
        a plurality of pivot blocks secured to said housing;
        a plurality of pawls, each pawl being rotatably secured to one of said plurality of pivot blocks via a pivot pin;
        a first plate having an opening therein for receiving said latch member there through;
        a second plate having an opening therein for receiving said latch member there through;
        at least one biasing member between first and second plates;
        wherein said latching member extends through said openings in said first and second plates and said bullet extends past said plurality of pawls and said first and second plates bias said pawls such that a substantial force is required to remove said latch member from said housing.

5. An apparatus according to claim 4 wherein at least one of said first and second plates comprises a body having at least one stabilization surface.

6. An apparatus according to claim 4 wherein said first plate comprises a body having an opening therein for receiving said latch member and a lead-in surface adjacent said opening.

7. An apparatus according to claim 4 wherein said at least one biasing member comprises a spring.

8. An apparatus according to claim 4 further comprising a plurality of biasing members and wherein at least one of said first and second plates comprises a body having a first surface having a plurality of recesses therein for receiving said plurality of biasing members.

9. An apparatus according to claim 1 wherein said utility line comprises a power line.

10. An apparatus for releasably securing a utility line to a utility pole comprising:

a housing assembly comprising a housing, means for securing said housing to a utility pole, and means for releasably securing said housing to a latch; and a latch comprising means for securing said latch to a utility line;

wherein said latch is released from said housing assembly when force exceeding a predetermined amount is applied to said utility line and after said release said latch may be re-attached to said housing assembly.

11. An apparatus according to claim 10, wherein said latch means comprises:

a housing;

a pivot block secured to said housing;

a pawl rotatably secured to said pivot block; and a compression assembly for biasing said pawl.

12. An apparatus for releasably securing a utility line to a utility pole according to claim 10 wherein said utility line comprises power distribution line.

13. An apparatus for releasably securing a utility line to a utility pole according to claim 10 wherein power service is not interrupted when said latch is released from said housing assembly.

14. An apparatus for releasably securing a utility line to a utility pole according to claim 1 wherein said utility line comprises power distribution line.

15. An apparatus for releasably securing a utility line to a utility pole according to claim 1 wherein power service is not interrupted when said latch member is released from said housing assembly.

* * * * *